US009280683B1

(12) United States Patent
Echeverria (10) Patent No.: US 9,280,683 B1
(45) Date of Patent: Mar. 8, 2016

(54) MULTI-SERVICE CLOUD STORAGE DECISION OPTIMIZATION PROCESS

(71) Applicant: International Business Machines Corporation, Armonk, NY (US)

(72) Inventor: Pedro Ivo M. Echeverria, Sao Paolo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/492,109

(22) Filed: Sep. 22, 2014

(51) Int. Cl.
*H04L 29/06* (2006.01)
*G06F 21/62* (2013.01)

(52) U.S. Cl.
CPC .... *G06F 21/6218* (2013.01); *G06F 2221/2107* (2013.01)

(58) Field of Classification Search
CPC .................. G06F 21/6218; G06F 2221/2107
USPC .................................. 713/165, 171; 709/201
See application file for complete search history.

(56) References Cited

U.S. PATENT DOCUMENTS

| | | | |
|---|---|---|---|
| 8,346,681 B2 | 1/2013 | Lauritsen | |
| 8,392,370 B1 | 3/2013 | Whitney et al. | |
| 8,407,190 B2 | 3/2013 | Prahlad et al. | |
| 8,620,879 B2 | 12/2013 | Cairns | |
| 9,128,472 B2 * | 9/2015 | Lawson | G05B 19/4185 726/28 |
| 9,137,131 B1 * | 9/2015 | Sarukkai | H04L 43/0876 726/28 |
| 2010/0057645 A1 | 3/2010 | Lauritsen | |
| 2010/0332818 A1 | 12/2010 | Prahlad et al. | |
| 2011/0022642 A1 | 1/2011 | deMilo et al. | |
| 2012/0022910 A1 | 1/2012 | Chi et al. | |
| 2013/0066940 A1 * | 3/2013 | Shao | H04L 67/1025 709/201 |
| 2013/0167193 A1 | 6/2013 | Brookins et al. | |
| 2013/0219483 A1 * | 8/2013 | Cho | G06F 15/16 726/13 |
| 2014/0020072 A1 * | 1/2014 | Thomas | H04L 63/0815 726/7 |
| 2014/0229736 A1 * | 8/2014 | Asim | H04L 9/0847 713/171 |
| 2014/0278808 A1 * | 9/2014 | Iyoob | G06Q 30/0206 705/7.35 |
| 2014/0279201 A1 * | 9/2014 | Iyoob | G06Q 30/0631 705/26.7 |
| 2014/0279915 A1 * | 9/2014 | Gadish | G06F 11/1076 707/641 |
| 2014/0324647 A1 * | 10/2014 | Iyoob | G06Q 40/12 705/30 |
| 2014/0365662 A1 * | 12/2014 | Dave | H04L 67/10 709/226 |
| 2015/0013018 A1 * | 1/2015 | Yan | H04W 12/08 726/28 |

FOREIGN PATENT DOCUMENTS

| | | |
|---|---|---|
| EP | 0810529 A1 | 12/1997 |
| WO | 9309498 A1 | 5/1993 |
| WO | 02054221 A3 | 7/2002 |
| WO | 2005029334 A3 | 3/2005 |
| WO | 2013068530 A2 | 5/2013 |

* cited by examiner

*Primary Examiner* — Haresh N Patel
(74) *Attorney, Agent, or Firm* — Ronald Kaschak; Arnold Bangali (57) ABSTRACT

A method for storage management of client files in a multi-service cloud environment is provided. The method includes receiving a mapped list of available cloud storage services of the multi-service cloud environment. The method further includes receiving categorization of the client files. The method further includes performing a qualitative analysis of the received mapped list of available cloud storage services and the categorized client files, to generate a decision data structure representative of cloud storage preferences of a client. The method further includes storing the client files in the multi-service cloud environment. The method further includes determining whether to encrypt the stored client files. The method further includes tagging individual files of the stored client files, or groups of client files of the stored client files, or a combination of the individually stored client files or the groups of client files for encrypting the stored client files.

20 Claims, 7 Drawing Sheets

MULTI-SERVICE CLOUD STORAGE DECISION OPTIMIZATION PROCESS

BACKGROUND

The present invention relates to cloud computing, and more particularly to cloud storage decision optimization of a personal cloud service for end users, or clients.

Cloud computing is the delivery of computing, as a service, rather than a product, whereby shared resources, such as, software, and information of the cloud are provided to computers and other devices, over a network. Cloud computing concepts include, for example, automation, virtualization, metering, and monitoring. For example, clouds, in cloud computing, can be classified as public, private or hybrid cloud computing systems. Cloud computing, or in simpler shorthand just "the cloud", also focuses on maximizing the effectiveness of the shared resources. Cloud resources are usually not only shared by multiple users, but they are also dynamically reallocated per demand.

SUMMARY

According to one embodiment of the present invention, a computer-implemented method for storage management of client files in a multi-service cloud environment, is provided. The computer implemented method comprises receiving, by one or more processors, a mapped list of available cloud storage services of the multi-service cloud environment. The computer implemented method further comprises receiving, by the one or more processors, categorization of the client files, based on the received mapped list of available cloud storage services. The computer implemented method further comprises performing, by the one or more processors, a qualitative analysis of the received mapped list of available cloud storage services and the categorized client files to generate a decision data structure representative of cloud storage preferences of a client of the multi-service cloud environment. The computer-implemented method further comprises storing, by the one or more processors, the client files in the multi-service cloud environment, based on the generated decision data structure of the cloud storage preferences of the client. The computer implemented method further comprises determining, by the one or more processors, whether to encrypt the stored client files, based on an indication to provide access control for the stored client files, in an index of the multi-service cloud environment. The computer implemented method further comprises tagging, by the one or more processors, individual files of the stored client files, or groups of client files of the stored client files, or a combination of the individually stored client files or the groups of client files for encrypting the stored client files, in response to the determination.

According to another embodiment, a computer system for storage management of client files in a multi-service cloud environment is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions receive a mapped list of available cloud storage services of the multi-service cloud environment. The computer system further comprises program instructions to receive categorization of the client files, based on the received mapped list of available cloud storage services. The computer system further comprises program instructions to perform a qualitative analysis of the received mapped list of available cloud storage services and the categorized client files to generate a decision data structure representative of cloud storage preferences of a client of the multi-service cloud environment. The computer system further comprises program instructions to store the client files in the multi-service cloud environment, based on the generated decision data structure of the cloud storage preferences of the client. The computer system further comprises program instructions to determine whether to encrypt the stored client files, based on an indication to provide access control for the stored client files, in an index of the multi-service cloud environment. The computer system further comprises program instructions to tag individual files of the stored client files, or groups of client files of the stored client files, or a combination of the individually stored client files or the groups of client files for encrypting the stored client files, in response to the determination.

According to another embodiment, a computer program product for storage management of client files in a multi-service cloud environment is provided. The computer program product comprises one or more computer-readable tangible storage devices and program instructions stored on at least one of the one or more storage devices. The computer program product further comprises program instructions receive a mapped list of available cloud storage services of the multi-service cloud environment. The computer program product further comprises program instructions to receive categorization of the client files, based on the received mapped list of available cloud storage services. The computer program product further comprises program instructions to perform a qualitative analysis of the received mapped list of available cloud storage services and the categorized client files to generate a decision data structure representative of cloud storage preferences of a client of the multi-service cloud environment. The computer program product further comprises program instructions to store the client files in the multi-service cloud environment, based on the generated decision data structure of the cloud storage preferences of the client. The computer program product further comprises program instructions to determine whether to encrypt the stored client files, based on an indication to provide access control for the stored client files, in an index of the multi-service cloud environment. The computer program product further comprises program instructions to tag individual files of the stored client files, or groups of client files of the stored client files, or a combination of the individually stored client files or the groups of client files for encrypting the stored client files, in response to the determination, in response to the determination.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein like reference numerals indicate like components, and:

DETAILED DESCRIPTION

Personal cloud storage service provides a platform for storing data in the cloud, or also, for automatically syncing the data across multiple computing systems or devices. For instance, personal cloud storage services has changed the way users or clients' use and optimize personal data files in computers, mobile phones, and other Internet-connected devices. Further, data of the user or client of the personal cloud storage can comprise, for example, home movies, personal music collections, or personal work files that the client, user, or colleagues of the client or the user are collaboratively managing together. However, users or clients of data files that are stored in cloud storage services, typically subscribe to different sets of specific cloud services, with specific storage capacities, for multiple users, but, without any specific customized data storage management plan for storing the data file of a specific user. Therefore, a data storage solution for a cloud storage service of the client, or the user, needs to be customized, based on storage preferences of each user.

Embodiments of the present invention include one or more circuits, or subassemblies of circuits, as well as, a system, or computer-implemented methods of operations for optimizing cloud storage service usage for a client, or an end user of a client file or data of a computing system or device.

The present invention provides a mechanism for systematically guiding the client, or the end user to make better data file storage decisions according a data grading system to identify where, when, or how to store the data in the cloud storage service, or if not to store the cloud storage data service at all. For example, the grading system is based on multiple quality analysis via a decision matrix, for identifying an appropriate, customized, and managed data storage service, specifically based on client preferences for storing the client data in the cloud data storage service. The end result is that the user can save money by better storing the data that has more value to him, and consequently, not storing the data that is not so valuable to him.

For example, a client or an end user has two terabytes of personal data file in his computing system, and the client would like to store the two terabytes in the cloud storage service. However, the client realizes that storing the entire two terabytes of data in the cloud storage service would be too expensive.

The present invention allows the client to first map cloud storage services that he already uses, map other possible cloud storage services that he could use, and categorize the data flies of the cloud to be stored in the cloud storage service according to various quality decision analyses for storing the data files the cloud storage services.

The result of the decision analyses would be a storage plan, which the user would follow for storing client data files in the cloud storage service, while considering costs, storage space, or other data storage mechanism that might possibly hinder storage of his client data files. For example, the client first maps, in a computing interface of a client device, a list of available cloud storage services for storing his client data files. For instance, according to at least one embodiment, the client would list what cloud services he subscribes to, and the space availability of each of the subscribed cloud storage service. The client would also list cost for upgrading the cloud storage services, their cost for maintaining storage of the client files, and also, uploading polices for the cloud services, and/or upgrade cost of the cloud storage services, in accordance with embodiments of the present invention.

Once the end user has mapped the services availabilities, costs and structures, he would then initiate performance of series of qualitative analysis to decide what data he would store, in which service, when the storage would be done, for how long. For example, a client system application of the client, maps additional subscription to storage is needed from which service, when to subscribe and for how long, based on the initiation of the client, in accordance with aspects of the invention. According to at least one embodiment, the client application would then determine if additional subscription to storage is needed from which service, when to subscribe and for how long.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other
programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
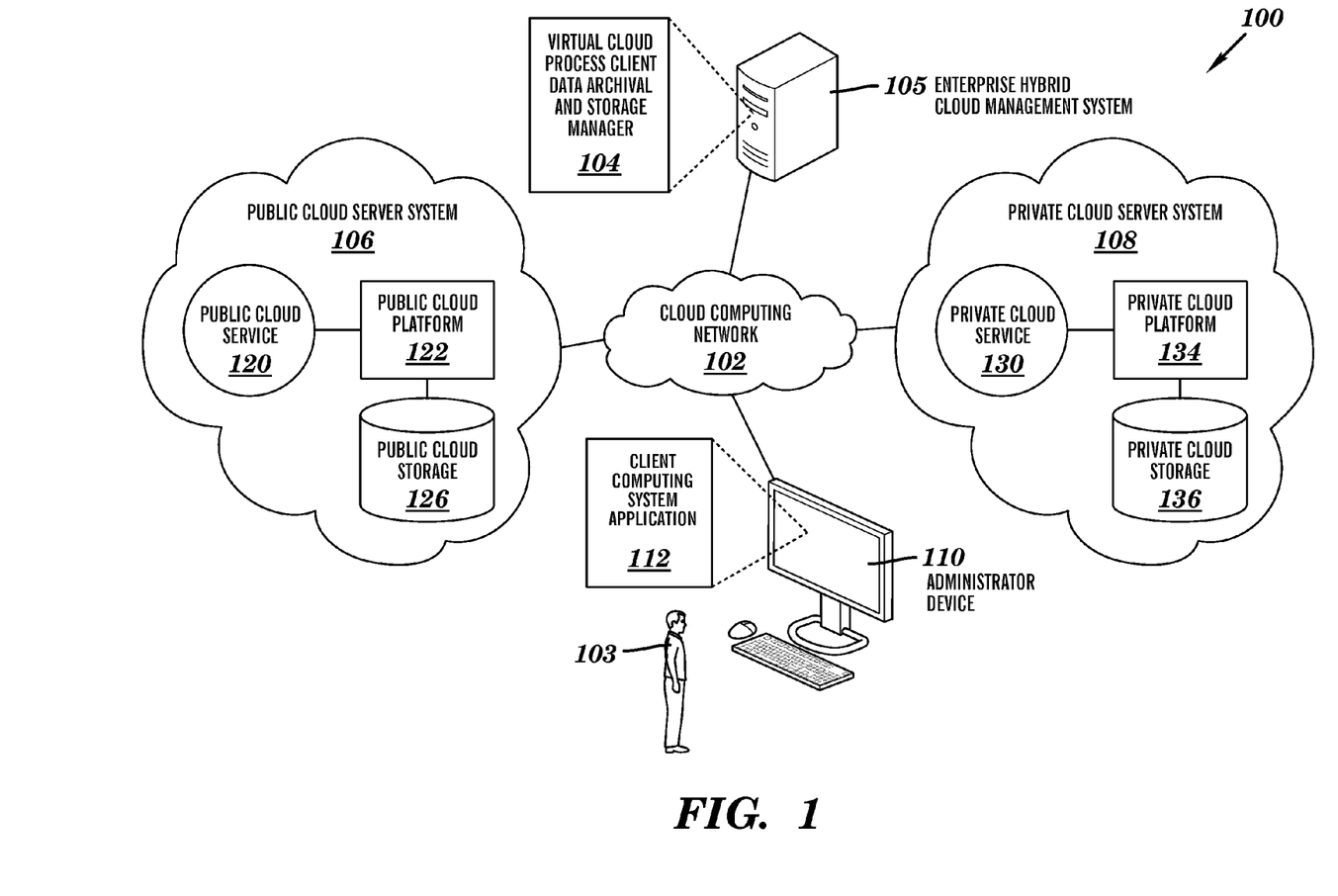
FIG. 1 is a block diagram of a multi-cloud management environment, for managing, optimizing, storing and encrypting client data, or client files, of an end user, or a client, in the multi-service cloud management environment, in accordance with an embodiment of the present invention.

The present invention will now be described in detail with reference to the accompanying Figures. Referring now to FIG. 1, multi-service cloud management environment 100 for managing, optimizing, and storing client files, or client data, of an end user, or a client, in multi-service cloud management environment 100, is illustrated, in accordance with embodiments of the present invention. Multi-service cloud management environment 100 includes enterprise hybrid cloud management system 105, public cloud 106, private cloud 108, and administrator device 110, all interconnected over cloud computing network 102.

Administrator device 110 is an end-user client computing device, or client system communication device, representative of a computing system having processor memory, and client database storage system, or device for transmitting a request, from a client program or a system application of administrator device 110, for storing client files, or client data, of an end user, or a client, in a cloud storage service of multi-service cloud management environment 100. Administrator device 110 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, laptop, or other portable devices.

Administrator device 110 includes client computing system application 112, for optimizing cloud storage usage, for client data files of client 103, in a cloud storage service of enterprise hybrid cloud management system 105. Client computing system application 112 can be any type of software system application that executes program instructions in administrator device 110, for managing the client files or data of client 103, in enterprise hybrid cloud management system 105. Administrator device 110 can also be a client enterprise system application that operates and executes program instructions of the Internet, and other software program applications of client computing system 110, thus providing a comprehensive, and diverse software program execution platform for managing the client files, and/or transmitting the client files to enterprise hybrid cloud management system 105, for storage of the client files in one or more cloud database services of enterprise hybrid cloud management system 105.

Client computing system application 112 enables client 103 to optimize the cloud storage usage of the client data, in enterprise hybrid cloud management system 105, for storing the client files or client data, of client 103, or an end user, in the one or more cloud database services. According to at least one embodiment, client 103 optimizes the client files for storing in the one or more cloud data services enterprise hybrid cloud management system 105, by mapping, in client system application 112, a list of available cloud storage services of cloud storage management system, and decision matrix for storing the client files, including, for instance, access control policies and storage cost information for storing the client files, storage capacity for storing the client files, and storage availability for storing the client files, in the one or more database storage services of enterprise cloud management system 105.

Public cloud 106 is a cloud computing model of multi-service cloud management environment 100, for managing, optimizing, and storing client files, or client data, of an end user, or a client, in multi-service cloud management environment 100. Public cloud 106 is a service provider that makes resources, such as client applications and storage, available to individual clients, users, of the general public, for storing the client files or client data over multi-service cloud management environment 100.

Public cloud 106 includes public cloud service 120, which provides the public cloud service for managing the client files, or data, public cloud platform 122 for optimizing the managed client files, and public cloud storage 126, for storing the optimized client files, or client data, in enterprise hybrid cloud management system 105m in accordance with embodiments of the present invention.

Private cloud 108 is a cloud computing model of multi-service cloud management environment 100, for managing, optimizing, and storing client files, or client data, of an end user, or a client, or an enterprise in multi-service cloud management environment 100. Private cloud 108 is an enterprise service provider of that makes resources, such as client applications and storage, available to, for instance, an organization for storing the client files or client data of the organization over multi-service cloud management environment 100. For example, private cloud 108 is, in a sense, an aspect of enterprise cloud management system 105, for managing, and storing the client files.

Private cloud 108 includes private cloud service 130, which provides the private cloud service for managing the client files of the organization, or data, private cloud platform 134 for optimizing the managed client files of the organization, and private cloud storage 136 for storing the optimized client files, or client data of the organization, in accordance with at least one embodiment of the present invention.

Enterprise hybrid cloud management system 105 represents a hybrid of "cloud" computers, interconnected by one or more cloud networks, wherein enterprise hybrid cloud management system 105 is a primary server for utilizing clustered computers when accessed through cloud network of cloud computing network 102. For example, a cloud computing system can be a common implementation of a central integrated system that provides cloud storage service capabilities for storing client files or client data, of an end user, or a client, in a cloud storage service of cloud storage management system.

The hybrid of cloud computers of enterprise hybrid cloud management system 105 can include a composition data management of two or more clouds, such as, public cloud 106 and private cloud 108, as described above. The hybrid of public cloud 106 and private cloud 108 can remain distinct entities, with distinctive functions, but are bound together, offering the benefits of multiple deployment models of multi-service cloud management environment 100, in accordance with embodiments of the present invention. Hybrid cloud, of enterprise hybrid cloud management system 105, can also mean the ability to connect collocation, managed and/or dedicated services with cloud resources for providing capabilities for storing client files in multi-service cloud management environment 100, in accordance with embodiments of the present invention.

Enterprise hybrid cloud management system 105 correlates software, storage, and server technologies of cloud services, such as, public cloud 106 and private cloud 108, into one simple, flexible, secure, integrated cloud management service, for storing client files or client data of client computing system application 112, and providing high performance, dynamic provisioning cloud storage service, for storing, archiving, uploading, monitoring, upgrading, or versioning of client files, stored in enterprise hybrid cloud management system 105. Enterprise hybrid cloud management system 105 includes virtual cloud process client data archival and storage manager, for storing and archiving the client files in enterprise hybrid cloud management system 105.

For instance, dynamic provisioning of cloud storage service of client files of enterprise hybrid cloud management system 105 can be a component of any type of storage device, storage server, storage area network, redundant array of independent discs (RAID), cloud storage device, or any type of data storage for maintaining a record of client files in multi-service cloud management environment 100, in accordance with embodiments of the present invention.

Cloud computing network 102 includes one or more networks of any kind that can provide communication links between various devices and computers connected together within multi-service cloud management environment 100. Cloud computing network 102 can also include connections, such as wired communication links, wireless communication links, or fiber optic cables. Cloud computing network 102 can also be implemented as a number of different types of networks, including, for example, a local area network (LAN), wide area network (WAN) or a packet switched telephone network (PSTN), or some other networked system.

For example, multi-service cloud management environment 100 can utilize the Internet with cloud network representing a worldwide collection of networks. The term "Internet" as used according to embodiments of the present invention refers to a network or networks that uses certain protocols, such as the TCP/IP protocol, and possibly other protocols such as the hypertext transfer protocol (HTTP) for hypertext markup language (HTML) documents that make up the world wide Web (the web).

Figure 2:
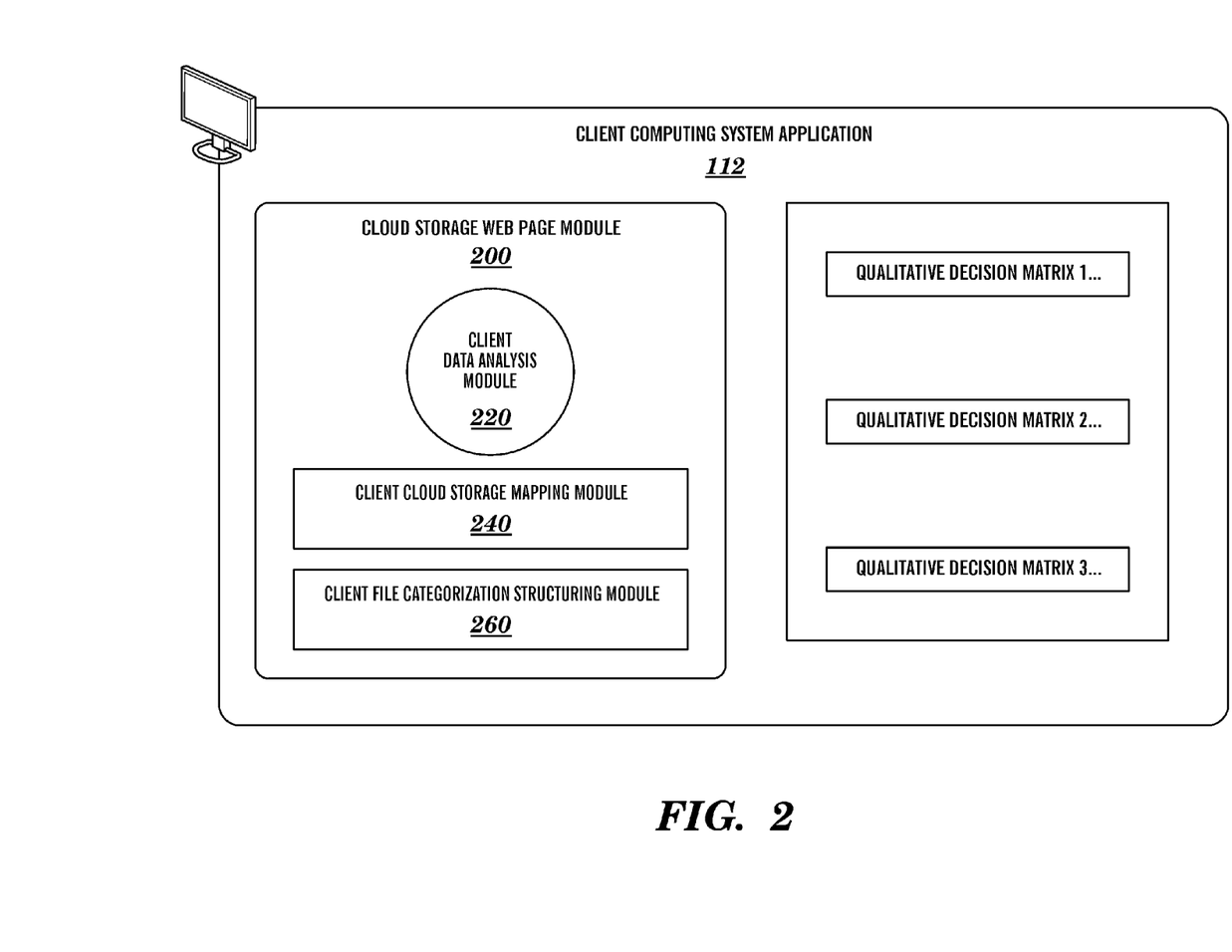
FIG. 2 is a functional block diagram illustrating program components of a client computing system application, for managing, client files in the computing system application, in accordance with embodiments of the present invention.

FIG. 2 is a functional block diagram illustrating program components of client computing system application 112, for managing, client files of by client 103, in a client interface of client computing system application 112, in accordance with embodiments of the present invention.

Client computing system application 112 can among other things display and transmit personal client cloud data services, accessible via cloud computing network 102, such as, online cloud network attached storage (NAS) device cloud, server device cloud, personal cloud web based services, personal cloud web server applications, or cloud mainframe work. For example, the personal client cloud data services can be digital client data content services, which are accessible via a display interface of client computing system application 112, for optimizing the client files, or client data, of client 103, in multi-service cloud management environment 100, based on unique file management and storage configurations, specific to preferences of client 103.

The personal client cloud service enables client 103 to store, synchronize, stream, and share multi-media, program applications, or device contents of client data of client computing system application 112, between one or more clients of in multi-service cloud management environment 100.

Client computing system application 112 can be also be a cloud web browser application program, for displaying or transmitting, among other things, personal client cloud services, accessible via cloud computing network 102, for optimizing and storing the client data or files in enterprise hybrid cloud management system 105. For example, client computing system application 112 can be a purely server-side application, a purely client-side application, or a hybrid server-side/client-side application that is cooperatively executed by one or more client cloud applications, for optimizing client files of client computing system application 112, for storage of the client files in enterprise hybrid cloud management system 105.

Client computing system application 112 includes cloud storage web page module 200. Cloud storage web page module 200 is a web browser plug-in/add-on that extends the functionality client computing system application 112 by adding additional user interface elements to client computing system application 112, for displaying, for displaying, among other things, personal client cloud services, accessible via cloud computing network 102, for transmittal, and storage, of the client files in a cloud storage service of enterprise hybrid cloud management system 105.

Cloud storage web page module 200 includes client data analysis module 220, client cloud storage mapping module 240, client file categorization structuring module 260, and qualitative decision matrix 1, 2, and 3, all of which are received in client computing system application 112, or via a client, or personal cloud service program of administrative device 110, for optimizing storage of client files of multi-service cloud management environment 100. For instance, each one of client data analysis module 220, client cloud storage mapping module 240, client file categorization structuring module 260, and qualitative decision matrix 1, 2, and 3 includes program code, such as Hypertext Markup Language (HTML) code or JavaScript code which, when executed, adds one or more system user interface elements to client computing system application 112, for displaying, among other things, personal client cloud services accessible via cloud computing network 102, for transmittal, and storage of the personal client cloud services, in a cloud storage service of cloud storage management system.

Cloud storage service mapping module 240 can be a client cloud web content application that displays among other things, in an interface of cloud storage web page module 200, personal cloud web based services, or a personal cloud web server applications, for mapping, in the interface of cloud storage service mapping module 240, by client 103, or by a system, an available list of cloud storage services of cloud storage management system, for optimizing, and storing, in the cloud storage service, for storing, synchronizing, streaming, and/or share multi-media, program applications, or device contents of client data of client computing system, in multi-service cloud management environment 100. According to at least one embodiment, the mapping of available cloud services by cloud storage mapping module can include, identification, by client 103, via the interface, of one or more of access control policies and cost information of at least one cloud storage service of cloud storage management system, storage capacity of the at least one cloud storage service, or storage availability of the at least one cloud storage services, for managing the client files in the multi-service cloud environment, in accordance with embodiments of the present invention.

Client 103 can also categorize the client files, via client file categorization structuring module 260, based on the mapped list of available cloud storage services, for storing the categorized client files in the multi-service cloud environment 100, of at least one of the cloud storage services of enterprise hybrid cloud management system 105. For example, client data analysis module 220 performs a qualitative of the mapped list of available cloud storage services and the categorized client files to generate a decision data structure representative of cloud storage preferences of the client files of client 103, for storing the client files, in a virtual cloud process client data and storage manager of enterprise hybrid cloud management system 105.

The performed qualitative analysis is based on a cloud based decision matrix of decision matrix, 1, 2, or 3, that defines where, when, or how, to store the client files of client application. The decision matrix can be an application tool of client data analysis module 220 that analyzes data segment for storing the client files, based on the mapped list of available cloud storage services and the categorized client files, representative of cloud storage preferences of the client 103, in accordance with embodiments of the present invention.

The decision matrix can thus provide a data type segment for storing the client files in the cloud storage service of enterprise hybrid cloud management system 105. For example, the generated data structure includes information that identifies type of client files to store in enterprise hybrid cloud management system 105, based on cloud storage subscriptions of the client of cloud storage service, projected and additional cloud storage for subscription by the client, and existing duration of the cloud storage subscriptions of the client. Client data analysis module 200 further generates a storage plan for storing the client files in cloud storage service, based on the decision matrix.

The storage plan represents the client's perceived value data for storing the client files, based on the qualitative analysis of the decision matrix. For example, client data analysis module 200 also generates a set of scripts of the perceived value data for managing the client files, based on the cloud storage preferences of the client. In at least one embodiment of the present invention, the generated set of scripts of documents represents information in the client files, representative of a data structure of cloud storage preferences, for storing the client files in cloud storage service.

Figure 3:
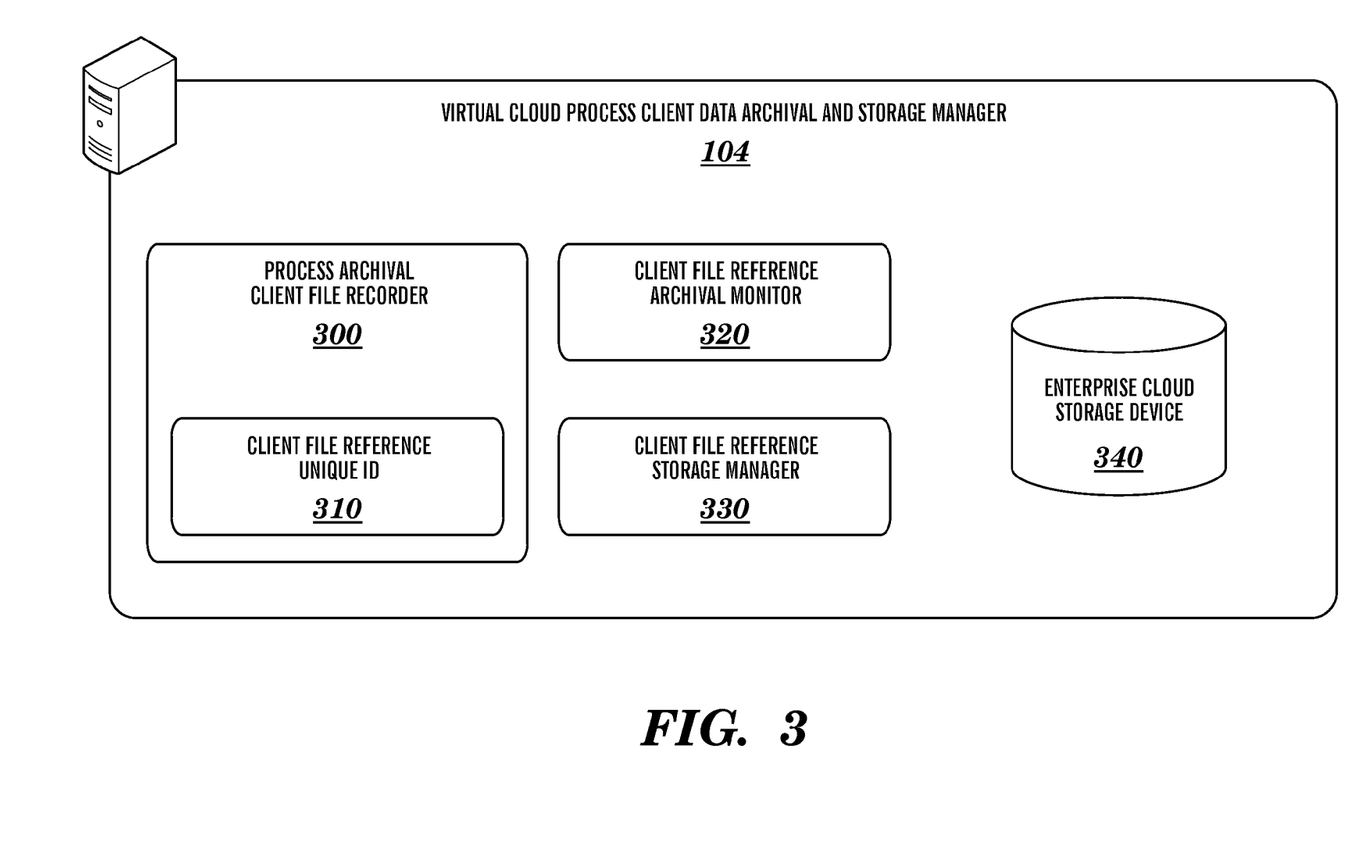
FIG. 3 is a functional block diagram illustrating program components of virtual cloud process client data archival storage manager, for optimizing, and storing client files, or client data, in multi-service cloud management environment, in accordance with the present invention.

FIG. 3 is a functional block diagram illustrating program components of virtual cloud process client data archival storage manager 104, for optimizing, and storing client files, or client data, of client 103, in multi-service cloud management environment 100, in accordance with the present invention.

Virtual cloud process client data archival and storage manager 104 receives, from client computing system application 112, the created a mapped list of available cloud storage services of the multi-service cloud environment, categorization of the client files, based on the received mapped list of available cloud storage services, from client computing system application, for storing the client files in virtual cloud process client data archival and storage manager. Virtual cloud process client data archival and storage manager 104 performs a qualitative analysis of the received mapped list of available cloud storage services and the categorized client files to generate a decision data structure representative, for storing the client files, based on cloud storage preferences of a client of the multi-service cloud environment, as described below.

Virtual cloud process client data archival and storage manager 104 includes cloud process archival client file recorder 300, client file reference archival monitor 320, client file reference storage manager 330, and enterprise cloud storage device 340, all of which are operational to store and archival the receives client files in enterprise hybrid cloud management system 105. Archival client file recorder 300 deploys, monitors, and manages client files in virtual cloud process client data archival and storage manager 104. Archival client file recorder 300 can be, for example, IBM® Tivoli® Service Automation Manager (IBM and Tivoli are trademarks of International Business Machines Corporation in the United States, other countries, or both). For example, archival client file recorder 300 maintains a record of when, how, and where to store and manage the client files in virtual cloud process client data archival and storage manager 104, in accordance with embodiment of the present invention.

Process archival client file recorder 300 stores, and maintains the recorded client files, as well as all the data or metadata of the client files in enterprise cloud storage device 340. Process archival client file recorder 300 also creates assigned identifiers for recording the client files, and its associated client file data in enterprise cloud storage device 340. Process archival client file recorder 300 monitors the client files, and all related data or metadata of the client files to be archived stored, or retrieved in cloud in enterprise cloud storage device 340. Process archival client file recorder 300 monitors the client files, in client application, or cloud storage management system, periodically, randomly, and/or using event-based monitoring for transmitting, storing, or archiving the client files, based on an indication to store the client files in client application.

Client file reference archival monitor 320 monitors the received client files for archiving the client files, including, for instance, recreating or restoring the client files, and all metadata associated with the client files and storage in enterprise cloud storage device 340, for future retrieval, in enterprise cloud storage device 340. Client file reference storage manager 330 manages the stored client files in enterprise cloud storage device 340, for future storage and retrieval of the client files in enterprise cloud storage device 340. Enterprise cloud storage device 340 can be any type of storage device, storage server, storage area network, redundant array of independent discs (RAID), cloud storage device, or any type of data storage for maintaining a record of client files in virtual cloud process client data archival and storage manager 104.

Archival client file recorder 300 maintains a record of client files that are stored, or archived in enterprise cloud storage device 340. Process archival recorder 300 creates client file reference unique ID 310, for assigning identifiers to all client files stored in cloud enterprise cloud storage device 340, based on generated decision data structure representative of client cloud storage preferences, for storing the client files. For example, the assigned identifiers are assigned to the client files for recording and storing all data or metadata associated with the client files in enterprise cloud storage device 340.

Figure 4:
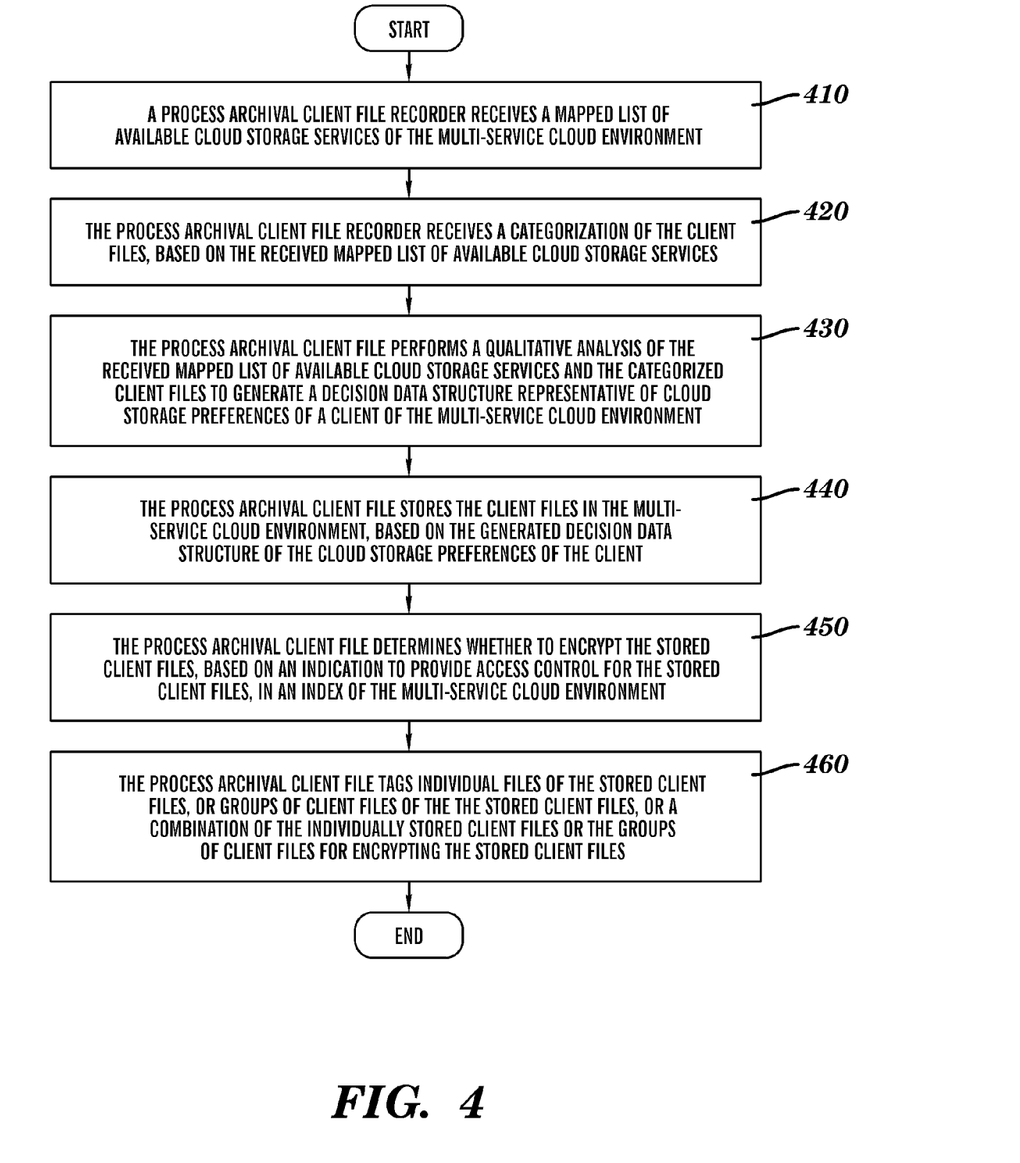
FIG. 4 is a flow diagram depicting steps performed by a process archival client file recorder for storing management of client files in a multi-service cloud environment, in accordance with embodiments of the present invention.

FIG. 4 is flow diagram depicting steps performed by a process archival client file recorder 300 for storing management of client files in multi-service cloud environment 100, in accordance with embodiments of the present invention.

At 410, process archival client file recorder 300 receives, from client computing system application 112, a mapped list of available cloud storage services of multi-service cloud environment 100, for storing client files of client 103 in enterprise cloud storage device 340. At 420, process archival client file recorder 300 also receives a categorization of the client files, based on the received mapped list of available cloud storage services. The mapped list of available storage services includes at least one of access control policies and cost information of at least one of the cloud storage services, storage capacity of at least one of the cloud storage services, and storage available of at least one of the cloud storage services for managing the client files in the multi-service cloud environment 100. Also, for instances, client 103 defines the mapped list of available cloud storage services in a client computing system application 112.

At 430, process archival client file recorder 300 performs a qualitative analysis of the received mapped list of available cloud storage services and the categorized client files to generate a decision data structure representative of cloud storage preferences of a client of multi-service cloud environment 100.

At 440, process archival client file recorder 300 stores the client files in the multi-service cloud environment, based on the generated decision data structure of the cloud storage preferences of the client 103. For example, process archival client file recorder 300 generates a client storage plan for storing client files, wherein the storage plan represents the client's perceived value data of the stored client files.

Process archival client file recorder 300 also generates a set of scripts of the perceived value data for managing the client files, based on cloud storage preferences of the client. For example, generated client storage plan is unique to at least one client of one or more clients, and wherein the plan includes the mapped list of available storage services and the categorized information for generating the decision data structure representative of cloud storage preferences of client 103.

For example, the categorized client files are based on a decision matrix that defines where, when, or how to store the categorized client files in the multi-service cloud environment 100 of at least one of the cloud storage services.

Also, the generated data structure includes information that identifies the type of client files to store in the multi-service cloud environment 100, based on at least one of cloud storage subscriptions of the client, projected and additional cloud storage for subscription by the client, and existing duration of the cloud storage subscriptions of the client, wherein the data structure includes unique qualitative analysis of cloud storage preferences of at least one or more clients of multi-service clod environment 100.

At 450, process archival client file recorder 300 determines whether to encrypt the stored client files, based on an indication to provide access control for the stored client files, in an index of the multi-service cloud environment. In response to the determination, at 460, process archival client file recorder tags individual files of the stored client files, or groups of client files of the stored client files, or a combination of the individually stored client files or the groups of client files for encrypting the stored client files.

Figure 5:
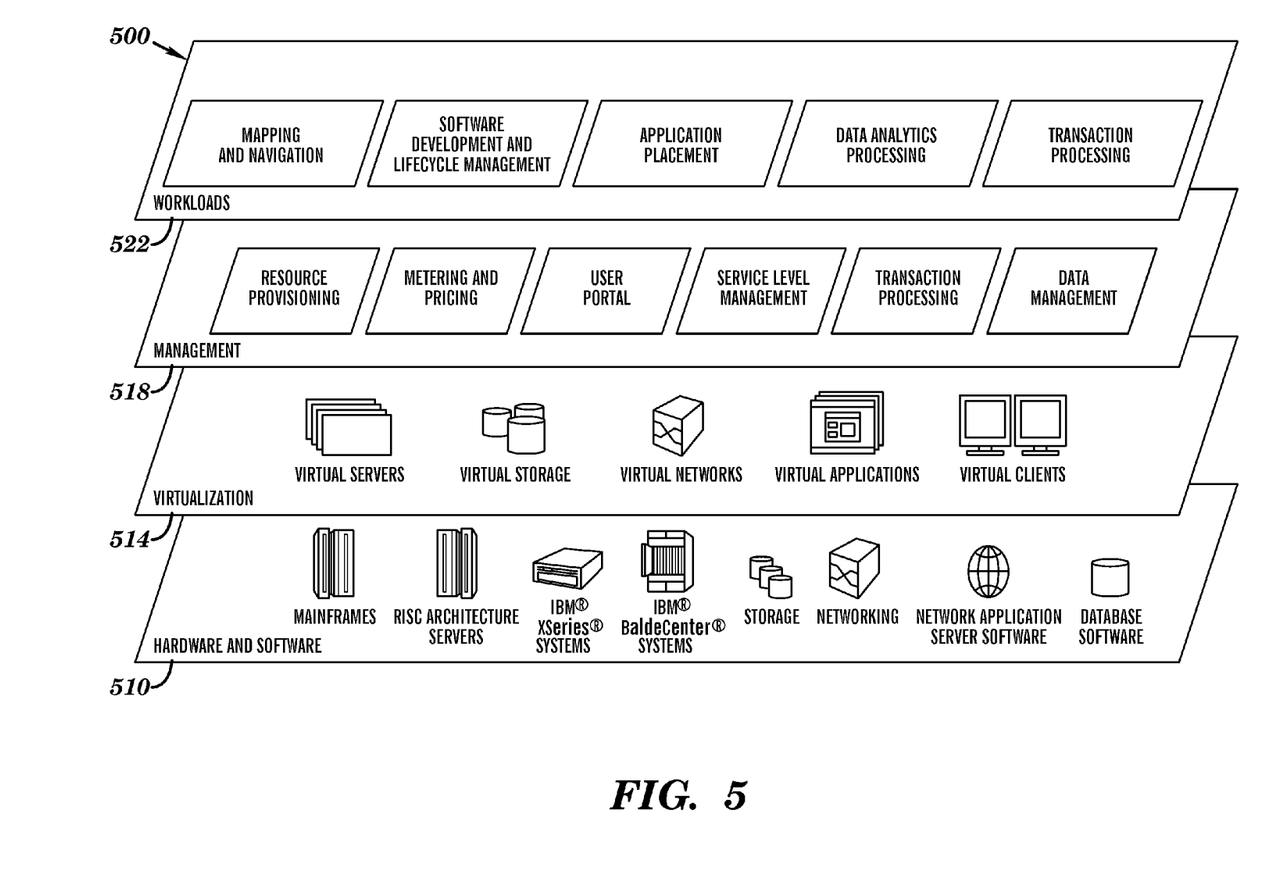
FIG. 5 is a set of functional abstraction layers provided by the multi-cloud computing environment of FIG. 1, in accordance with embodiments of the present invention.

Referring now to FIG. 5, a set of functional abstraction layers 500, provided by the multi-cloud computing environment 100 of FIG. 1, is shown, in accordance with embodiments of the present invention. It should be understood in advance that the components, layers, and functions shown in FIG. 5 are intended to be illustrative only and embodiments of the invention are not limited thereto. As depicted, the following layers and corresponding functions are provided.

The hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 514 provides an abstraction layer from which the following examples of virtual entities may be provided: virtual servers; virtual storage; virtual networks, including virtual private networks; virtual applications and operating systems; and virtual clients.

In one example, the management layer 518 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 522 provides examples of functionality for which the cloud computing environment may be utilized. Examples of workloads and functions which may be provided from this layer include: mapping and navigation; software development and lifecycle management; virtual classroom education delivery; data analytics processing; transaction processing; and placing an application on a private portion and a public portion of the multi-cloud computing environment 100.

Figure 6:
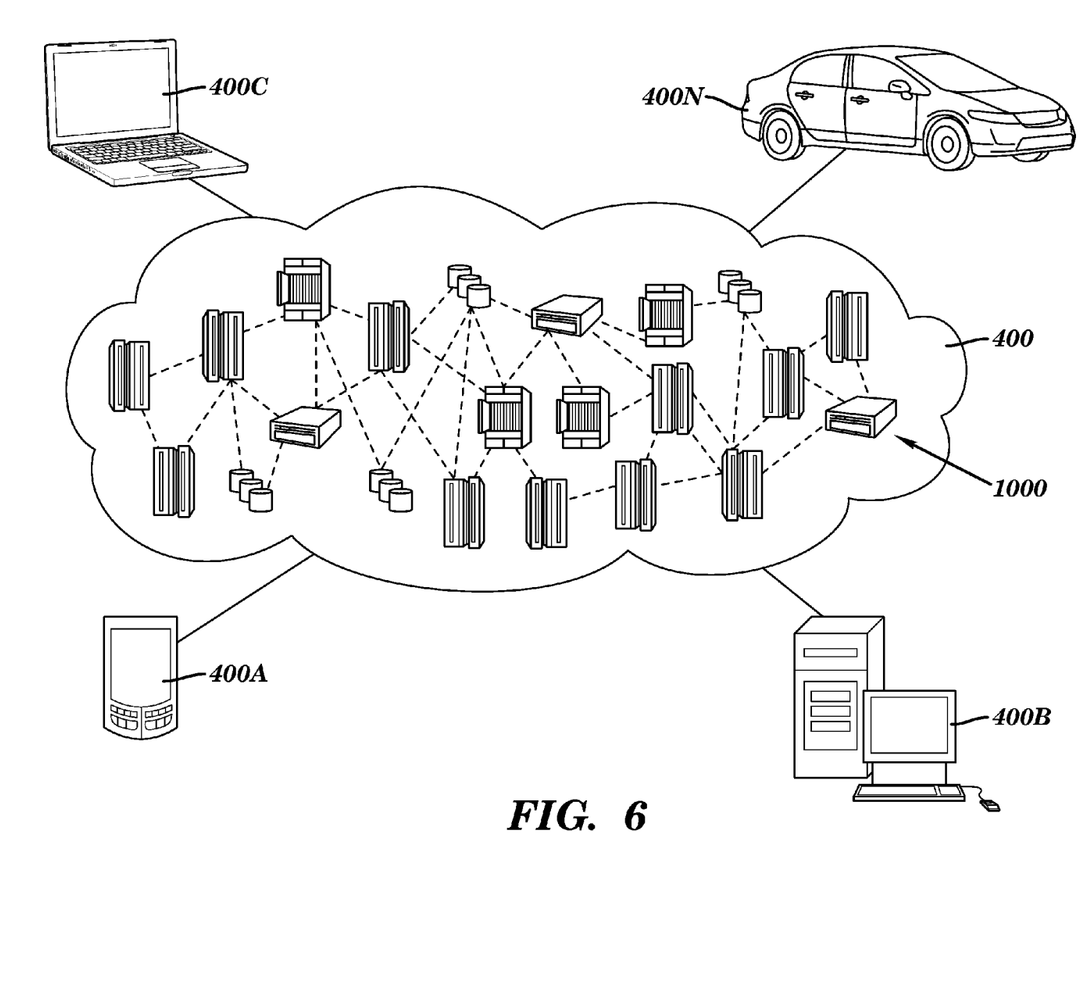
FIG. 6 is an illustrative of a cloud computing environment, in accordance with embodiments of the present invention.

Referring now to FIG. 6, an illustrative cloud computing environment 400 is depicted, in accordance with embodiments of the present invention. Cloud computing environment 400 may include, for example, the hybrid cloud environment 100 of FIG. 1. As shown, the cloud computing environment 400 comprises one or more cloud computing nodes, each of which may be computing device 1000 (FIG. 6) with which local computing devices used by cloud consumers, such as, for example, a personal digital assistant (PDA) or a cellular telephone 400A, a desktop computer 400B, a laptop computer 400C, and/or an automobile computer system 400N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 400 to offer infrastructure, platforms and/or software as services for which a cloud consumer does not need to maintain resources on a local computing device. It is understood that the types of computing devices 400A-N shown in FIG. 7 are intended to be illustrative only and that the computing nodes 1000 and the cloud computing environment 400 can communicate with any type of computerized device over any type of network and/or network addressable connection (e.g., using a web browser).

Figure 7:
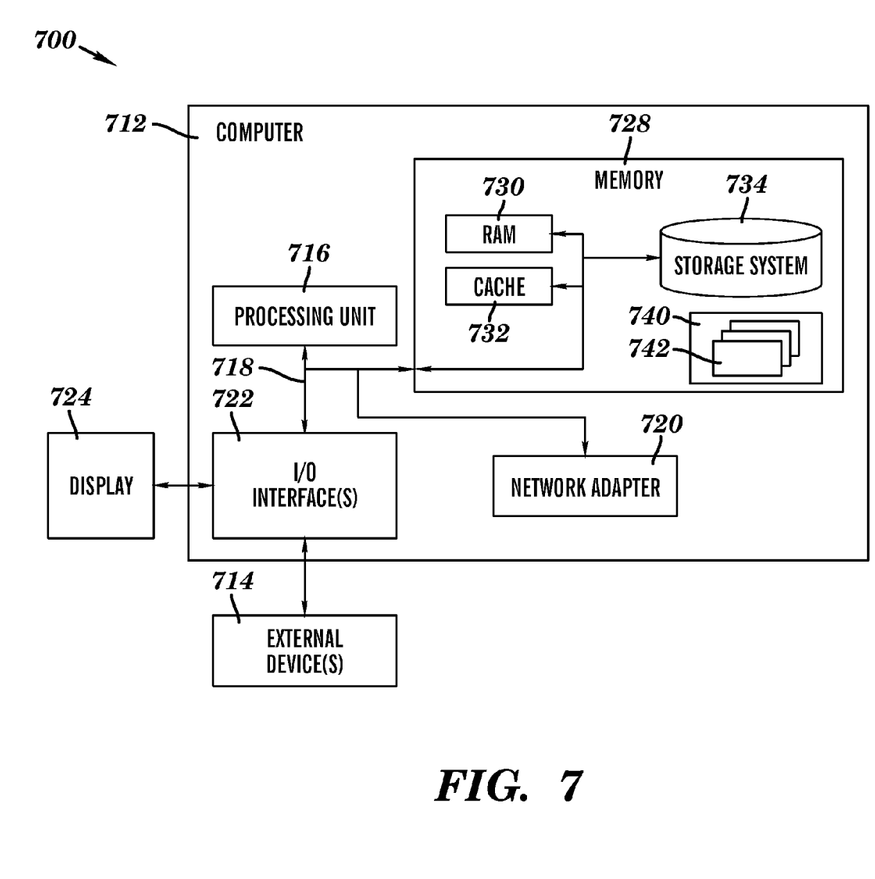
FIG. 7 illustrates a block diagram of components of a computer system in accordance with embodiments of the present invention.

FIG. 7 is a functional block diagram of a computer system, in accordance with an embodiment of the present invention.

Computer system 700 is only one example of a suitable computer system and is not intended to suggest any limitation as to the scope of use or functionality of embodiments of the invention described herein. Computer system 700 is capable of being implemented and/or performing any of the functionality set forth hereinabove.

In computer system 700 there is computer 712, which is operational with numerous other general purpose or special purpose computing system environments or configurations. Examples of well-known computing systems, environments, and/or configurations that may be suitable for use with computer 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of administrator device 110 client computing system application can include or can be implemented as an instance of computer 712.

Computer 712 may be described in the general context of computer system executable instructions, such as program modules, being executed by a computer system. Generally, program modules may include routines, programs, objects, components, logic, data structures, and so on that perform particular tasks or implement particular abstract data types. Computer 712 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 7, computer 712 is shown in the form of a general-purpose computing device. The components of computer 712 may include, but are not limited to, one or more processors or processing units 716, memory 728, I/O interface 722, and bus 718 that couples various system components including memory 728 to processing unit 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 712 typically includes a variety of computer system readable media. Such media may be any available media that is accessible by computer 712, and includes both volatile and non-volatile media, and removable and non-removable media.

Memory 728 includes computer system readable media in the form of volatile memory, such as random access memory (RAM) 730 and/or cache 732. Computer 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Virtual cloud process client data archival and storage manager 114 can be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein. For example, virtual cloud process client data archival and storage manager 114 is implemented as or are an instance of program 740.

Computer 712 may also communicate with one or more external devices 714 such as a keyboard, a pointing device, etc., as well as display 724; one or more devices that enable a user to interact with computer 712; and/or any devices (e.g., network card, modem, etc.) that enable computer 712 to communicate with one or more other computing devices. Such communication occurs via Input/Output (I/O) interfaces 722.

Still yet, computer 712 communicates with one or more networks such as a local area network (LAN), a general wide area network (WAN), and/or a public network (e.g., the Internet) via network adapter 720. As depicted, network adapter 720 communicates with the other components of computer 712 via bus 718. It should be understood that although not shown, other hardware and/or software components could be used in conjunction with computer 712. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for storage management of client files in a multi-service cloud environment has been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method for storage management of client files in a multi-service cloud environment, the computer-implemented method comprising the steps of:
   receiving, by one or more processors, a mapped list of available cloud storage services of the multi-service cloud environment;
   receiving, by the one or more processors, categorization of the client files, based on the received mapped list of available cloud storage services;
   performing, by the one or more processors, a qualitative analysis of the received mapped list of available cloud storage services and the categorized client files to generate a decision data structure representative of cloud storage preferences of a client of the multi-service cloud environment;

storing, by the one or more processors, the client files in the multi-service cloud environment, based on the generated decision data structure of the cloud storage preferences of the client;

determining, by the one or more processors, whether to encrypt the stored client files, based on an indication to provide access control for the stored client files, in an index of the multi-service cloud environment; and in response to the determination, tagging, by the one or more processors, individual files of the stored client files, or groups of client files of the stored client files, or a combination of the individually stored client files or the groups of client files for encrypting the stored client files.

2. The computer-implemented method of claim 1 further including the steps of:

generating, by the one or more processors, a client storage plan for storing client files, wherein the storage plan represents the client's perceived value data of the stored client files; and generating, by the one or more processors, a set of scripts of the perceived value data for managing the client files, based on cloud storage preferences of the client.

3. The computer-implemented method of claim 2, wherein the generated client storage plan is unique to at least one client of one or more clients, and wherein the plan includes the mapped list of available storage services and the categorized information for generating the decision data structure representative of cloud storage preferences of the client.

4. The computer-implemented method of claim 1, wherein the mapped list of available storage services includes at least one of access control policies and cost information of at least one of the cloud storage services, storage capacity of at least one of the cloud storage services, and storage available of at least one of the cloud storage services for managing the client files in the multi-service cloud environment.

5. The computer-implemented method of claim 4, wherein the client defines the mapped list of available cloud storage services in a client application.

6. The computer-implemented method of claim 1, wherein the categorized client files are based on a decision matrix that defines where, when, or how to store the categorized client files in the multi-service cloud environment of at least one of the cloud storage services.

7. The computer-implemented method of claim 1, wherein the generated data structure includes information that identifies the type of client files to store in the multi-service cloud environment, based on at least one of cloud storage subscriptions of the client, projected and additional cloud storage for subscription by the client, and existing duration of the cloud storage subscriptions of the client, wherein the data structure includes unique qualitative analysis of cloud storage preferences of at least one or more clients.

8. A computing system for storage management of client files in a multi-service cloud environment, the computing system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions receive a mapped list of available cloud storage services of the multi-service cloud environment;

program instructions to receive categorization of the client files, based on the received mapped list of available cloud storage services;

program instructions to perform a qualitative analysis of the received mapped list of available cloud storage services and the categorized client files to generate a decision data structure representative of cloud storage preferences of a client of the multi-service cloud environment;

program instructions to store the client files in the multi-service cloud environment, based on the generated decision data structure of the cloud storage preferences of the client;

program instructions to determine whether to encrypt the stored client files, based on an indication to provide access control for the stored client files, in an index of the multi-service cloud environment; and program instructions to tag individual files of the stored client files, or groups of client files of the stored client files, or a combination of the individually stored client files or the groups of client files for encrypting the stored client files, in response to the determination.

9. The computer system of claim 8 further includes:

program instructions to generate a client storage plan for storing client files, wherein the storage plan represents the client's perceived value data of the stored client files; and program instructions to generate a set of scripts of the perceived value data for managing the client files, based on cloud storage preferences of the client.

10. The computer system of claim 9, wherein the generated client storage plan is unique to at least one client of one or more clients, and wherein the plan includes the mapped list of available storage services and the categorized information for generating the decision data structure representative of cloud storage preferences of the client.

11. The computer system of claim 8, wherein the mapped list of available storage services includes at least one of access control policies and cost information of at least one of the cloud storage services, storage capacity of at least one of the cloud storage services, and storage available of at least one of the cloud storage services for managing the client files in the multi-service cloud environment.

12. The computer system of claim 11, wherein the client defines the mapped list of available cloud storage services in a client application.

13. The computer system of claim 8, wherein the categorized client files are based on a decision matrix that defines where, when, or how to store the categorized client files in the multi-service cloud environment of at least one of the cloud storage services.

14. The computer system of claim 8, wherein the generated data structure includes information that identifies the type of client files to store in the multi-service cloud environment, based on at least one of cloud storage subscriptions of the client, projected and additional cloud storage for subscription by the client, and existing duration of the cloud storage subscriptions of the client, wherein the data structure includes unique qualitative analysis of cloud storage preferences of at least one or more clients.

15. A computer program product for storage management of client files in a multi-service cloud environment, the computer program product comprising:

one or more computer-readable tangible storage devices and program instructions stored on at least one of the one or more storage devices, the program instructions comprising:

program instructions receive a mapped list of available cloud storage services of the multi-service cloud environment;

program instructions to receive categorization of the client files, based on the received mapped list of available cloud storage services;

program instructions to perform a qualitative analysis of the received mapped list of available cloud storage services and the categorized client files to generate a decision data structure representative of cloud storage preferences of a client of the multi-service cloud environment;

program instructions to store the client files in the multi-service cloud environment, based on the generated decision data structure of the cloud storage preferences of the client;

program instructions to determine whether to encrypt the stored client files, based on an indication to provide access control for the stored client files, in an index of the multi-service cloud environment; and program instructions to tag individual files of the stored client files, or groups of client files of the stored client files, or a combination of the individually stored client files or the groups of client files for encrypting the stored client files, in response to the determination, in response to the determination.

16. The computer program product of claim 15 further includes:

program instructions to generate a client storage plan for storing client files, wherein the storage plan represents the client's perceived value data of the stored client files; and program instructions to generate a set of scripts of the perceived value data for managing the client files, based on cloud storage preferences of the client.

17. The computer system of claim 16, wherein the generated client storage plan is unique to at least one client of one or more clients, and wherein the plan includes the mapped list of available storage services and the categorized information for generating the decision data structure representative of cloud storage preferences of the client.

18. The computer system of claim 15, wherein the mapped list of available storage services includes at least one of access control policies and cost information of at least one of the cloud storage services, storage capacity of at least one of the cloud storage services, and storage available of at least one of the cloud storage services for managing the client files in the multi-service cloud environment.

19. The computer system of claim 18, wherein the client defines the mapped list of available cloud storage services in a client application.

20. The computer system of claim 15, wherein the categorized client files are based on a decision matrix that defines where, when, or how to store the categorized client files in the multi-service cloud environment of at least one of the cloud storage services.

* * * * *